United States Patent [19]
Edson et al.

[11] Patent Number: 5,099,397
[45] Date of Patent: Mar. 24, 1992

[54] FUZED SOLID ELECTROLYTE CAPACITOR

[75] Inventors: Douglas M. Edson, Alfred; Edward K. Hayden, York Beach, both of Me.

[73] Assignee: Sprague Electric Company, North Adams, Mass.

[21] Appl. No.: 677,203

[22] Filed: Mar. 29, 1991

[51] Int. Cl.$^5$ .................... H01G 9/00; H01L 21/64
[52] U.S. Cl. .................................. 361/534; 29/25.03
[58] Field of Search .................. 361/534, 539, 540; 29/25.03

[56] References Cited

U.S. PATENT DOCUMENTS

| | | | |
|---|---|---|---|
| 4,107,762 | 8/1978 | Shirn et al. | 361/534 |
| 4,282,645 | 8/1981 | Thompson et al. | 29/25.03 |
| 4,675,790 | 6/1987 | DeMatos et al. | 361/540 |
| 4,763,228 | 8/1988 | Su | 361/534 |
| 4,935,848 | 6/1990 | Yamane et al. | 361/534 |

FOREIGN PATENT DOCUMENTS 53533  3/1989  Japan .................. 29/25.03

Primary Examiner—Donald A. Griffin

[57] ABSTRACT

A plastic film having a resin coating is used in mechanically securing the cathode of a solid electrolyte capacitor to a paddle of a leadframe while electrically insulating the cathode from the paddle.

3 Claims, 1 Drawing Sheet

FUZED SOLID ELECTROLYTE CAPACITOR

BACKGROUND OF THE INVENTION

This invention relates to solid electrolyte capacitors which include safety fuzes, and more particularly to such a capacitor having an improved mechanical connection of its cathode body to a paddle of its leadframe.

Prior art constructions for providing solid electrolyte capacitors with safety fuzes have in common the need to provide support for the body of a capacitor having a fuze as the cathode electrical connection to a leadframe during encapsulation of the capacitor.

Shirn and Maher U.S. Pat. No. 4,107,762 teach supporting a capacitor body on a paddle of a leadframe by means of an intervening deposit of an insulating epoxy resin. However, the process for mounting the capacitor body on the epoxy entails pressing the body into epoxy, which results in varying thicknesses of insulation from one body to another, even on the same leadframe. In worst case mounting of a capacitor body on an epoxy layer, the uneven surface of the body protrudes through the epoxy so that the body contacts the paddle to short out any fuze interconnection between the paddle and the body.

Ideally, during manufacturing, the capacitor body should be held securely in place, because device handling prior to encapsulation, and encapsulation itself, apply mechanical forces and stress to the device. Such stress is the cause of broken joints between the cathode body and the capacitor mounting, and also broken and weakened connections between the capacitor body/fuze/cathode lead assembly. This type of defect or separation is very difficult to detect in the finished capacitor if it has gone undetected prior to encapsulation. The result could be a point contact within the device itself and the failure mode could show up at any time in the future as an open.

All prior art mountings for fuzed capacitors provide little mechanical support at the cathode end of the device. This can have a negative impact on the yield and subsequent reliability of the capacitor.

An object of this invention is to provide an easily manufacturable technique that provides high mechanical strength to the cathode end of a fuzed capacitor. It is another object of this invention to provide uniform and continuous insulation between a capacitor body and a paddle on a leadframe. Another object is to provide that desired uniform and continuous insulation by a simplified procedure that eliminates need for complex pressure control in the mounting of the body on the paddle.

SUMMARY OF THE INVENTION

In accordance with this invention, structural bonding of a capacitor body to a paddle of a leadframe is accomplished by interposing a plastic tape between the body and the paddle. The interposed plastic tape is preferably a polyester tape having an adhesive coat on one side which is applied to the paddle. Uncured epoxy resin is deposited on the upper surface of the tape, onto which epoxy deposit the capacitor body is mounted. Mounting of a capacitor body on the epoxy resin without fear of shorting the cathode to the paddle is ensured by the tape. The uncured resin accommodates irregularities in the surface of the capacitor body so as to facilitate level mounting of the body for later encapsulation without concern for show-through deficiencies.

DESCRIPTION OF THE PREFERRED EMBODIMENTS

Figure 1:
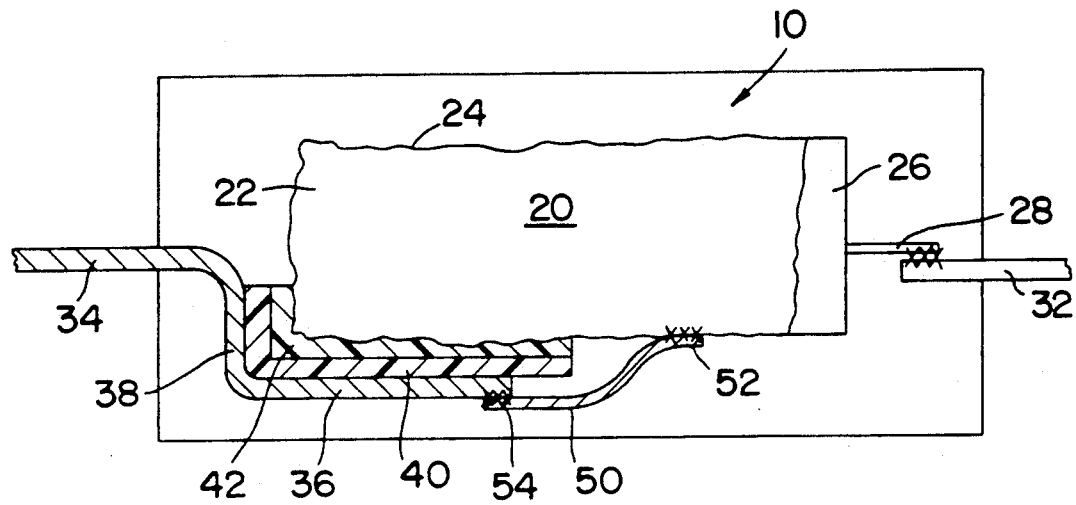
FIG. 1 is a partial cross-section of a molded capacitor constructed according to this invention.

FIG. 1 is a pictorial rendition of a molded capacitor 10 showing the cathode construction of this invention in cross-section. Capacitor 10 includes a capacitor body 20 having a cathode end 22 with a rough surface 24 as a result of the conventional method of applying the several coatings constituting the cathode contact by means of dipping operations. The aforementioned U.S. Pat. No. 4,107,762 describes such a conventional method of producing a solid electrolyte capacitor with the rough surface identified in this application as surface 24.

Rough contact surface 24 covers a major extent of capacitor body 20, with care being taken to ensure that anode portion 26 is free of cathode coatings. Anode contact for capacitor 10 is shown as a riser member 28 which is in ohmic contact with the internal anode of capacitor body 20. Riser 28 is joined to anode portion 32 of leadframe 30 by spot welding or the like.

The cathode construction for the fuzed capacitor 10 of this invention includes conventional contact layers of graphite and silver overlying the solid electrolyte layers of manganese dioxide or the like. The silver outer layer exhibits the rough outer surface 24 of cathode 22 which is mechanically anchored to cathode portion 34 of leadframe 30 while being electrically isolated therefrom.

The mounting of cathode 22 to portion 34 of leadframe 30 includes a layer of polyester tape 40 which is adhered to paddle 36 and arm 38 of portion 34 by any of the adhesives commonly employed on commercial sticky tape. Tape 40 ensures a minimum spacing for isolation purposes, and is not subject to the thinning and shorting deficiencies of the prior art.

Before pellet mounting, a layer 42 of uncured epoxy is applied on the upper exposed surface of tape 40. Layer 42 is insolative as is tape 40; together they insulate cathode 22 from paddle 36, while establishing proper seating of capacitor 20 for later molding in a protective material.

Figure 3:
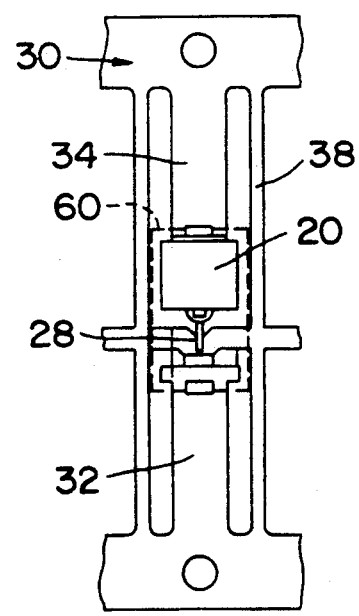
FIG. 3 is a plan view of a single section of the leadframe of FIG. 2 having a capacitor mounted prior to being molded.

Leadframe 30 includes rails 38 which interconnect anode portion 32 and cathode portion 34 during mounting capacitor 20 onto the leadframe, and the subsequent curing of resin 42 and molding of protective package 60 (shown in broken line in FIG. 3). Rails 38 and portions 32 and 34 are cut outside package 60 so as to provide separate capacitors 10 for end use. The extending portions 32 and 34 are formed, after separation from leadframe 30, around the ends of capacitor 10 so as to serve as surface mount terminations for soldering the capacitor to printed circuit boards.

Fuze 50 provides the sole electrical connection between cathode 22 and paddle 36. Fuze 50 is preferably of thermally active material, which choice of material permits fuze 50 to be welded as at 52 to cathode surface 22, and as at 54 to paddle 36. Fuze 50 alternatively may be formed of a "Pyrofuse" material such as an alloy of aluminum and palladium whenever higher fuzing temperatures are required. In accordance with prior art fuzed capacitors, fuze 50 preferably includes spacing provisions such as shown in the prior art so as to ensure the melted fuze material has enough space that cooling and solidifying of the fuze material does not reconnect the path from cathode 22 to paddle 36.

Figure 2:
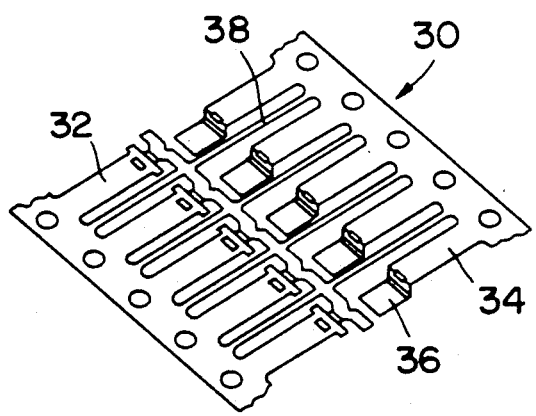
FIG. 2 is a perspective of a multiple section leadframe shaped for the construction of this invention.

In the practice of this invention, it has been found that the preferred application of tape 40 to paddle 36 is accomplished by laying down a layer of polyester tape across the multiple leadframes 30 of FIG. 2 to the string of cathode paddles. The tape is continuous and has an adhesive strip on one side. The adhesive backing is placed on the cathode paddle so that the polyester tape is adhered to the cathode paddle. The tape is applied continuously to the leadframe strip. Immediately after application of the continuous tape the excess tape is punched out and removed from the leadframe. Another preferred embodiment is practiced by punching out the tape before the tape is mounted on the leadframe. The cathode pocket is then formed with the polyester in place.

At this point a layer of insulating epoxy resin adhesive is placed on the polyester tape. While this material is still in the uncured state the capacitor body is placed into the adhesive/film/cathode pocket and then cured. This provides a firm insulating connection between the cathode lead and the capacitor body. Support is made in two planes, since the bend in the 'L' shape of the cathode pocket provides adherence to the capacitor body on portions of both the end surface and a side wall of the cathode.

What is claimed is:

1. A fuzed solid electrolyte capacitor comprising a capacitor body secured to a leadframe with an anode riser from said body affixed to an anode portion of said leadframe and a cathode from said body mounted on a paddle of said leadframe, said cathode being mechanically secured to said paddle in electrical isolation therefrom by a layer of plastic tape and a layer of uncured resin, and a fuze member electrically connecting said cathode to said paddle.

2. The fuzed solid electrolyte capacitor of claim 1 wherein said cathode has a rough outer surface which is seated in said uncured resin.

3. The fuzed solid electrolyte capacitor of claim 1 wherein said plastic tape is secured to said paddle, and said uncured resin overlies said plastic tape.

* * * * *